United States Patent
Witek et al.

(10) Patent No.: US 11,886,877 B1
(45) Date of Patent: Jan. 30, 2024

(54) MEMORY SELECT REGISTER TO SIMPLIFY OPERAND MAPPING IN SUBROUTINES

(71) Applicant: Apple Inc., Cupertino, CA (US)

(72) Inventors: Richard T. Witek, Redmond, WA (US); Peter C. Eastty, San Francisco, CA (US); Rajarshi Mukherjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 17/548,794

(22) Filed: Dec. 13, 2021

Related U.S. Application Data

(60) Provisional application No. 63/247,855, filed on Sep. 24, 2021.

(51) Int. Cl.
*G06F 9/30* (2018.01)
*G06F 12/02* (2006.01)
*G06F 9/38* (2018.01)

(52) U.S. Cl.
CPC ...... *G06F 9/30043* (2013.01); *G06F 9/30101* (2013.01); *G06F 9/3806* (2013.01); *G06F 12/0238* (2013.01); *G06F 2212/7201* (2013.01)

(58) Field of Classification Search
CPC . G06F 9/34; G06F 9/3455; G06F 9/54; G06F 9/30043; G06F 9/30101; G06F 9/3806; G06F 9/30145; G06F 9/461; G06F 12/1009; G06F 12/0842; G06F 12/10; G06F 12/06; G06F 12/109; G06F 2212/65; G06F 2212/7201

See application file for complete search history.

(56) References Cited

U.S. PATENT DOCUMENTS

| | | | | |
|---|---|---|---|---|
| 3,693,165 A | * | 9/1972 | Reiley | G06F 12/1063 |
| | | | | 711/E12.064 |
| 5,107,417 A | * | 4/1992 | Yokoyama | G06F 12/0292 |
| | | | | 711/206 |
| 5,123,094 A | * | 6/1992 | MacDougall | G06F 9/544 |
| | | | | 709/215 |
| 5,375,213 A | * | 12/1994 | Arai | G06F 12/109 |
| | | | | 711/208 |
| 6,505,292 B1 | * | 1/2003 | Witt | G06F 9/3842 |
| | | | | 712/237 |
| 8,719,548 B2 | | 5/2014 | Altman et al. | |
| 9,280,492 B2 | | 3/2016 | Caprioli et al. | |

(Continued)

FOREIGN PATENT DOCUMENTS

| | | | | |
|---|---|---|---|---|
| CN | 112035272 | * | 6/2019 | G06F 9/461 |
| CN | 113220469 | * | 3/2021 | G06F 9/544 |
| WO | 2021174233 A1 | | 9/2021 | |

*Primary Examiner* — Keith E Vicary
*Assistant Examiner* — Kasim Alli
(74) *Attorney, Agent, or Firm* — Kowert, Hood, Munyon, Rankin & Goetzel, P.C.

(57) ABSTRACT

A processor may include a plurality of data memories storing operands that may be operated upon by the processor. Load/store operations may specify a memory location in one of the data memories to be accessed using a memory select value that selects the data memory and an address within the selected data memory. The memory select values may be mapped from virtual memory select values associated with the load/store operations to physical memory select values that may be used to access the data memory.

20 Claims, 6 Drawing Sheets

(56) References Cited

U.S. PATENT DOCUMENTS

| | | | |
|---|---|---|---|
| 2003/0018876 A1* | 1/2003 | Zahir | G06F 12/1009 |
| | | | 711/E12.059 |
| 2004/0088566 A1* | 5/2004 | Chou | G06F 21/78 |
| | | | 726/34 |
| 2010/0042808 A1* | 2/2010 | Moyer | G06F 9/3552 |
| | | | 712/E9.082 |
| 2017/0262291 A1 | 9/2017 | Lai et al. | |
| 2022/0091911 A1* | 3/2022 | Du | G06F 9/461 |
| 2022/0309006 A1* | 9/2022 | Liu | G06F 12/1009 |

* cited by examiner

US 11,886,877 B1

MEMORY SELECT REGISTER TO SIMPLIFY OPERAND MAPPING IN SUBROUTINES

This application claims benefit of priority to U.S. Provisional Patent Application Ser. No. 63/247,855, filed on Sep. 24, 2021. The above application is incorporated herein by reference in its entirety. To the extent that any incorporated material conflict with the material expressly set forth herein, the expressly set forth material controls.

BACKGROUND

Technical Field

Embodiments described herein are related to processors and, more particularly, to mapping virtual operand specifiers to physical operand specifiers in processors.

Description of the Related Art

A processor typically executes instructions defined in an instruction set architecture (ISA) implemented by the processor. The ISA specifies the format of the instructions (e.g., how the instructions are stored in memory), the operation of each instruction (e.g., source operands, operations performed to produce result, and result operands at which the results are stored). Various configuration registers specifying modes of the processor may also be part of the ISA. Operands are typically in a register file or a memory location.

More particularly, application-specific processors such as digital signal processors (DSPs), audio processors, image signal processors, etc., often have local memories that store input data to be operated upon. When multiple local memories are used, the instructions specify the selected local memory and an address in the selected local memory to locate an operand. In contrast, register files are accessed by register number.

BRIEF DESCRIPTION OF THE DRAWINGS

The following detailed description refers to the accompanying drawings, which are now briefly described.

Figure 1:
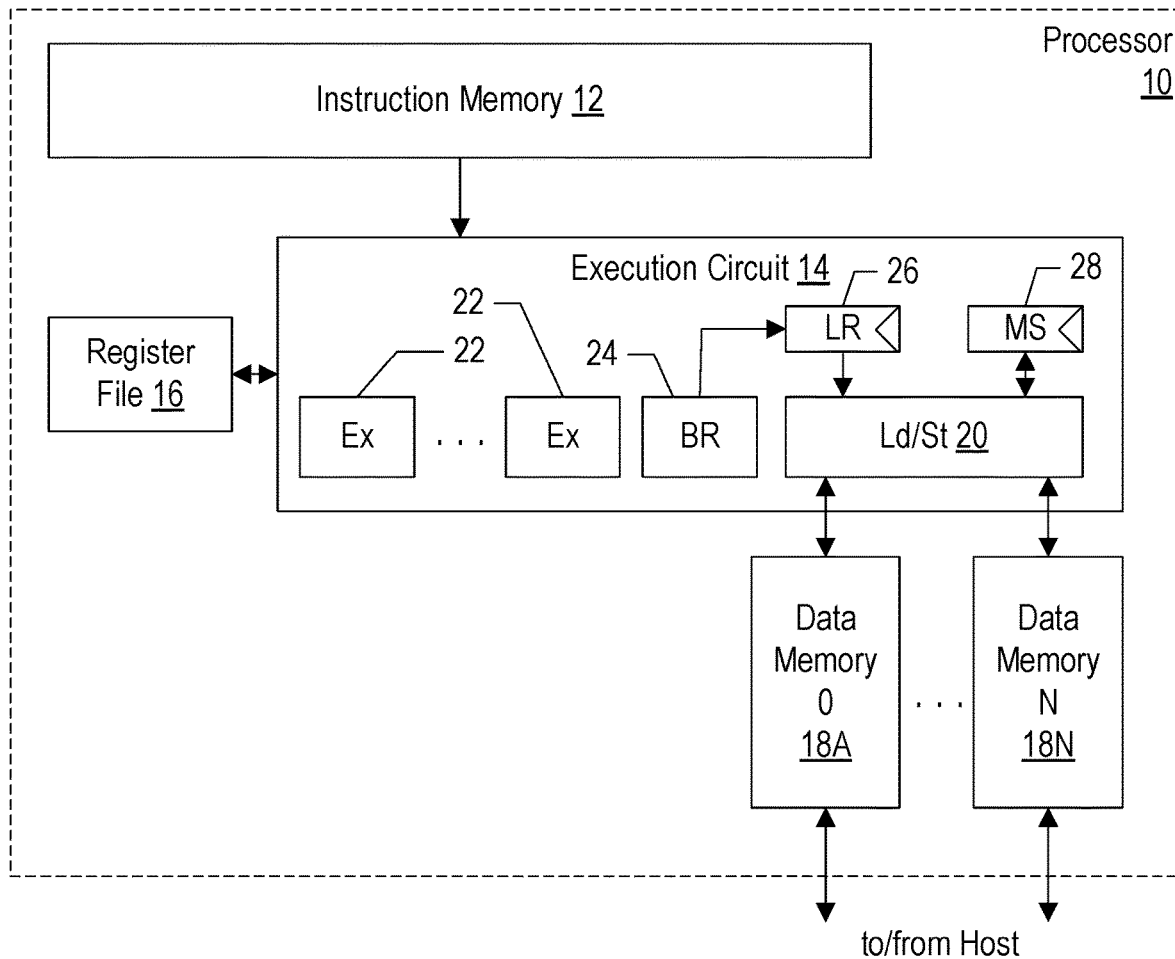
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, a processor has multiple local memories to provide flexibility in storing input operands provided from a host (e.g., different streams of input operands can be stored in different local memories). However, the provision of local memories may complicate software mechanisms such as subroutines. A given subroutine may support a call with arguments in specific local memories (e.g., the first argument can be in local memory 2, the second argument can be in local memory 1, etc.). However, different calling programs may have the arguments that they wish to provide to the subroutine in different local memories. To avoid expensive movement of data from one local memory to another, or multiple copies of the subroutine with arguments in different local memories, the processor may support a memory select register which maps virtual memory select values specified in instructions to physical memory select values.

FIG. 1 is a block diagram of one embodiment of a processor 10. In the illustrated embodiment, the processor 10 includes an instruction memory 12, an execution circuit 14, a register file 16, and a plurality of data memories 18A-18N. The instruction memory 12 is coupled to the execution circuit 14, which is further coupled to the register file 16 and the data memories 18A-18N. The execution circuit 14 may include a plurality of execute units 22, a branch unit 24, and a load/store (ld/st) unit 20. The execution circuit 14 may further include a link register (LR) 26 and a memory select (MS) register 28. The branch unit 24 is coupled to the link register 26. The registers 26 and 28 are coupled to the load/store unit 20, which is further coupled to the data memories 18A-18N.

The load/store unit 20 may be configured to perform load/store operations to move data between the register file 16 and the data memories 18A-18N. Branch operations and other instruction operations performed by the execute units 22 may use operands stored in the register file 16. Thus, load operations may load data from the data memories 18A-18N to the register file 16, other instruction operations may operate on the data in the register file to produce results, and store operations may store data from the register file 16 to the data memories 18A-18N. This type of instruction set in which memories are only accessed by dedicated load/store operations and other instruction operations use the register file may be referred to as a load/store architecture. The architecture is part of the instruction set architecture (ISA) implemented by the processor 10.

The load/store operations may identify a memory location to read or write based on a memory select value that identifies one of the memories 18A-18N and an address that identifies the memory location within the selected memory. Thus, as mentioned above, supporting generic subroutines that can be called by any calling thread having operands in any of the data memories 18A-18N is challenging. The processor 10 may employ the memory select register 28 to facilitate a flexible mechanism for accessing operands in the memories 18A-18N. More particularly, the load/store operations may specify a virtual memory select value, and the contents of the memory select register 28 may be used to map the virtual memory select values to physical memory select values. In this manner, a subroutine may be coded to expect certain operands in a particular virtual data memory identified by a particular virtual memory select value. By programming the memory select register at the start of the subroutine to map the particular virtual memory select value to the physical memory select value identifying the memory 18A-18N that is storing the data to be operated upon, the same subroutine may be used to operate on operands in any of the data memories 18A-18N.

Thus, the memory select register 28 may comprise a plurality of fields, each field corresponding to a respective virtual memory select value. The field may contain the physical memory select value to which the virtual memory select value is currently mapped. During execution of a load/store operation, the load/store unit 20 may be configured to map the virtual memory select value from the load/store operation to the physical memory select value using the contents of the memory select register. With the address specified by the load/store operation and the physical memory select value, the memory location in the selected data memory 18A-18N may be identified and the operand may be accessed (e.g., read for a load operation or written for a store operation).

A subroutine call operation (e.g., a branch operation used to jump to the start of the subroutine) may also specify a new value for the memory select register, based on the locations within the data memories 18A-18N of the operands on which the subroutine is to operate. Alternatively, the branch that performs a subroutine call may be preceded by an operation which loads the memory select register. Because the memory select register 28 has a current mapping in it that may map the virtual memory select values to particular physical memory select values for the instruction sequence that is calling the subroutine (the "calling thread"), part of updating the memory select register 28 may include mapping the newly-specified memory select register contents (e.g., an updated mapping) through the current memory select register contents (e.g., the current mapping) to determine the correct mapping for the subroutine (e.g., a modified mapping). The memory select register may be updated with the modified mapping. Additionally, the branch unit 24 may cause the current mapping in the memory select register 28 to be saved in the link register 26. The link register 26 may also store the return address that may be used to return to the calling thread, in an embodiment.

The subroutine may terminate with a return operation, which may be a branch operation to the address stored in the link register 26. Additionally, the return operation may cause the memory select mapping stored in the link register to be returned to the memory select register 28. Since the return is restoring the memory select register 28 to its value at the occurrence of the subroutine call, the memory select register 28 may simply be updated with the saved mapping from the link register 26. That is, the saved mapping may not be remapped through the current mapping in the fashion describe above for the subroutine call operation.

In an embodiment, a load memory select operation may be included in the ISA to load an updated value into the memory select register 28 from a register in the register file 16. The load memory select operation may be used to initialize the memory select register 28, for example, when a thread begins execution. The load memory select operation may also be used to establish a desired mapping of virtual memory select values to physical memory select values at any point during execution by loading an updated value into the memory select register. The memory select value provided by the load memory select operation may not be remapped through the current mapping in the fashion describe above for the subroutine call operation.

In an embodiment, the ISA may also specify a memory control field in a given instruction. The execution circuit 14 may be configured to map the virtual memory select value to the respective physical memory select value based on a first value coded into the memory control field. A second, different value coded into the memory control field may specify that the virtual memory select value is used as the physical memory select value (that is, the memory select register 28 may not be used to map the memory select value for the corresponding instruction). Thus, based on the second value in the memory control field, the execution circuit 14 may be configured to bypass the memory select mapping and use the virtual memory select value as the physical memory select value. A third value coded into the memory select field may cause the execution circuit 14 to use the memory select mapping stored in the link register 26 for the instruction. In this manner, a subroutine may be given access to the data memories 18A-18N as they are mapped in the calling thread. That is, the memory select mapping in the link register may be stored by the execution circuit 14 based on a subroutine call operation, and the execution circuit may be configured to map the virtual memory select value to a second respective physical memory select value based on the second register and further based on a third value coded into the memory control field.

The instruction memory 12 may be configured to store instructions to be fetched by the execution circuit 14. The instruction memory 12 may have any capacity, configuration, and construction. The execution circuit 14 may generate fetch addresses for the instruction memory 12 based on the current instruction execution. For example, if the instruction includes a branch operation, the target address of the branch instruction may be the fetch address. If the instruction does not include a branch operation and does not generate an exception, the execution core 14 may generate the next consecutive address (e.g., the sequential address).

The execution circuit 14 may generally include the circuitry that implements instruction operation execution. As mentioned previously, the load/store unit 20 may execute the load/store operations. The branch unit 24 may execute branch operations, including subroutine call operations, return operations, conditional branch operations, and unconditional branch operations. The execute units 22 may be configured to execute the remaining instruction operations (e.g., arithmetic/logic instructions of various types). There may be any number of execute units 22, branch units 24, and load/store units 20 in various embodiments. The execution circuit 14 may also include a variety of other circuitry to provide for out of order operation, branch prediction, and other microarchitectural features, as desired in various embodiments.

The register file 16 may include the registers implemented by the processor 10. The register file 16 may be an architectural register file with storage locations assigned to each register defined in the ISA, in an embodiment. The register file 16 may be a physical register file used by register renaming hardware in the execution circuit 14 (not shown in FIG. 1). In such an embodiment, the register renaming hardware may maintain a mapping of physical registers to the current architected state of the registers and/or various speculative states of the registers.

The data memories 18A-18N may have any capacity, configuration, and construction, although each memory 18A-18N may have the same capacity, configuration and construction as each other memory 18A-18N to permit freely remapping the memories 18A-18N via the memory select register 28. In an embodiment, the processor may be a signal processor (e.g., digital signal processor, such as an audio processor). A stream of data samples may represent a given signal (e.g., an audio signal). A host device (e.g., a CPU processor, or a DMA circuit programmed by a CPU processor or other processor) may load independent streams of data samples that represent signals into the respective data memories 18A-18N, or a subset of the data memories 18A-18N. In such an embodiment, the execution circuit 14 may be configured to perform audio processing on audio data stored in one or more of the plurality of data memories, for example. The ISA implemented by the processor 10 may, for example, be optimized for audio processing. Other embodiments may be configured to perform other types of signal processing or any other type of processing, such as general purpose processing, network processing, etc.

In one embodiment, the ISA may specify a very long instruction word (VLIW) architecture in which multiple instruction operations are specified in a single instruction word that is fetched by the processor 10. The instruction word may be decoded, and various instruction operations may be identified and issued to execution hardware that is designed to perform the instruction operations. Thus, an instruction operation may be an operation specified by an instruction that a given execute unit, branch unit, or load/store unit may execute. There may be multiple instruction operations in an instruction, such as a VLIW instruction word. Non-VLIW ISAs may also specify instructions that decode into one or more instruction operations. In some cases, each instruction in an ISA may decode into an instruction operation and thus instruction and instruction operation may be effectively synonymous in those ISAs. Other ISAs may specify more complex instructions, at least some of which decode into multiple instruction operations. Particularly complex instructions may be implemented as microcode routines that include instruction operations which, when executed, implement the operation specified for the corresponding instruction.

Figure 2:
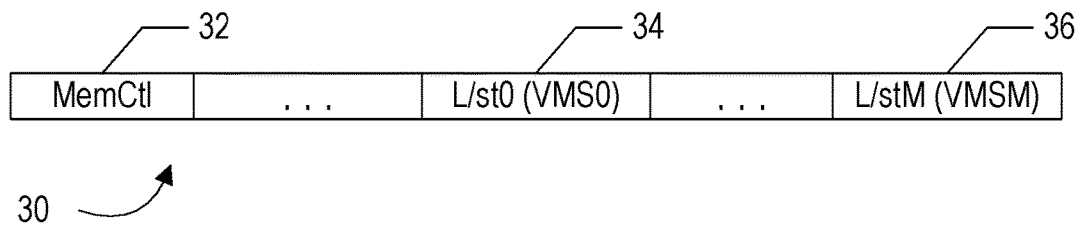
FIG. 2 is a block diagram of one embodiment of an instruction for the processor shown in FIG. 1.

FIG. 2 is a block diagram of one embodiment of an instruction 30 that may be defined in one embodiment of the ISA implemented by the processor 10. In the illustrated embodiment, the instruction 30 may be a VLIW instruction. The instruction 30 may include a memory control field (MemCtl) 32 which may contain the memory control coding for the instruction 30 (e.g., "use memory select register 28", "use link register 26", or "virtual=physical"). The instruction 30 may include various fields to define instruction operations, illustrated by the ellipses in FIG. 2, including various load/store operations such as the 1/st0 instruction operation through the 1/stM instruction operation (reference numerals 34 and 36). Various embodiments support at least one load/store operation in the instruction 30 and may support more than one load/store operation, such as up to M load/store operations as shown in FIG. 2 (where M is a positive integer). Each load/store operation may specify a virtual memory select value (e.g., VMS0 and VMSM in FIG. 2).

Other embodiments may implement non-VLIW instructions. For example, individual load/store instructions, branch instructions, and arithmetic/logic instructions may be supported. In such an embodiment, the memory control field 32 may be part of each load/store instruction. Alternatively, there may be a default (e.g., "use the memory select register 28") and other options may be chosen by including the memory control field with appropriate encodings. In general, a memory control field may be viewed as corresponding to a given load/store operation. The memory control field corresponding to the given load/store operation may be the memory control field in the VLIW instruction word that includes the given load/store operation, the memory control field in the non-VLIW instruction that specifies the given load/store operation, or a default value.

Figure 3:
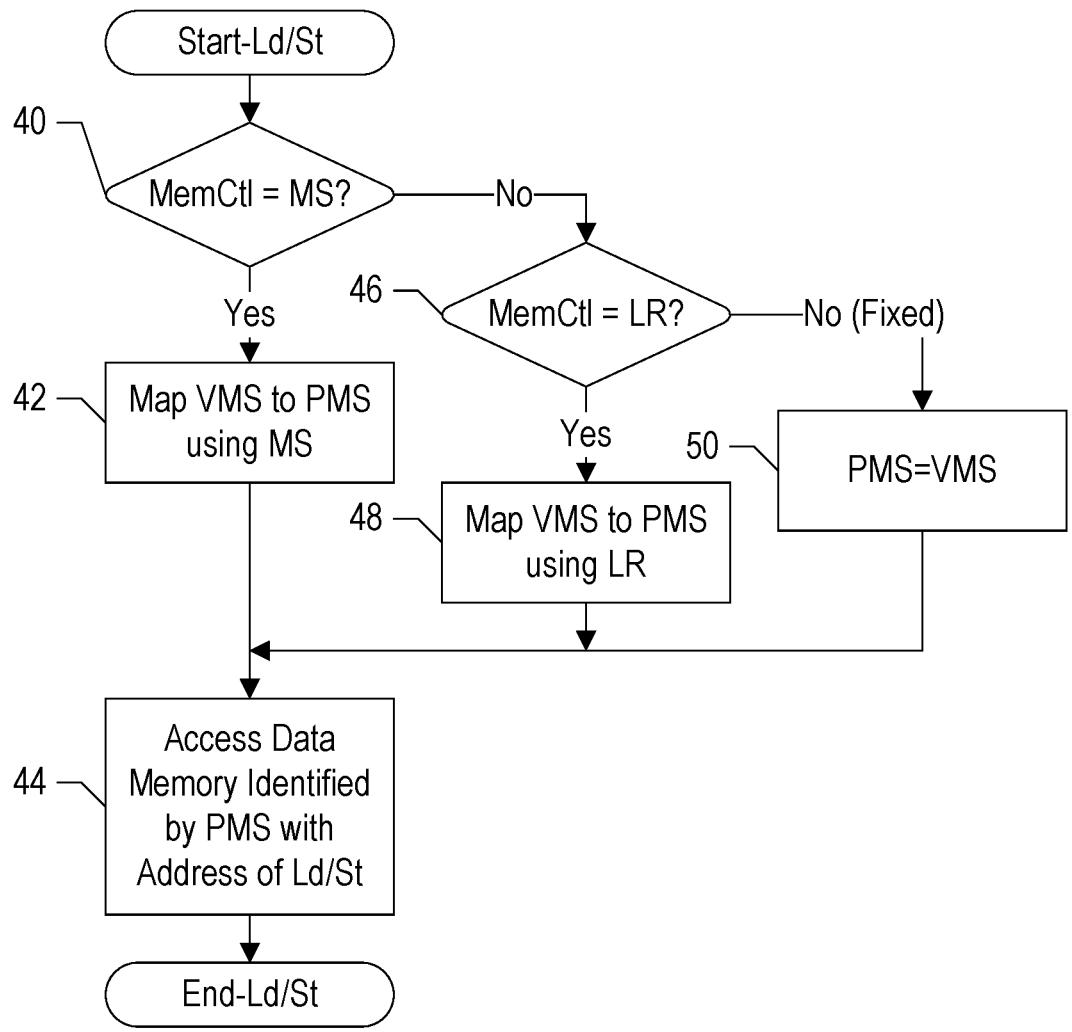
FIG. 3 is a flowchart illustrating operation of one embodiment of the processor shown in FIG. 1 to execute a load/store operation.

FIG. 3 is a flowchart illustrating operation of one embodiment of the processor 10 to perform a load/store operation. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles. The processor 10 may be configured to implement the operation shown in FIG. 3.

If the memory control field corresponding to the load/store operation is coded to indicate use of the memory select register 28 (decision block 40, "yes" leg), the processor 10 may be configured to map the virtual memory select (VMS) value from the load/store operation to a physical memory select (PMS) value using the contents of the memory select register 28 (block 42). For example, the VMS value may select a field of the memory select register 28 and the contents of the field may be the PMS. If the memory control field corresponding to the load/store operation is coded to indicate use of the link register (decision block 40, "no" leg and decision block 46, "yes" leg), the processor 10 may be configured to map the virtual memory select (VMS) value from the load/store operation to a physical memory select (PMS) value using the contents of the link register 26 (block 48). For example, the VMS value may select a field in the portion of the link register 26 that stores the saved MS value, and the contents of the field may be the PMS. The remaining portion of the link register may store the return address for fetching in the instruction memory 12. Otherwise (decision blocks 40 and 46, "no" legs), the fixed option is selected (or the no mapping option, e.g., "virtual=physical"), and the processor 10 may be configured to use the VMS value as the PMS value (block 50). The processor 10 may access the data memory 18A-18N that is identified by the PMS with the address of the load/store operation to complete the access (block 44).

Figure 4:
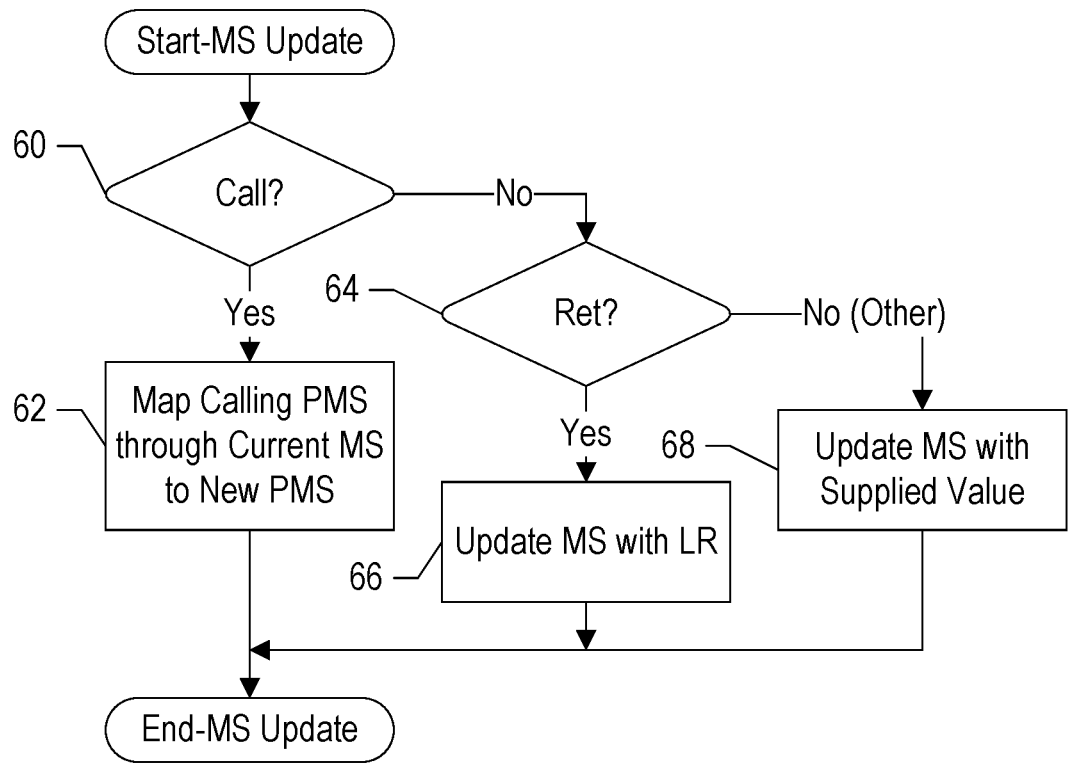
FIG. 4 is a flowchart illustrating operation of one embodiment of the processor shown in FIG. 1 to update a memory select register.

FIG. 4 is a flowchart illustrating operation of one embodiment of the processor 10 to update the memory select register 28 based on various instruction operations. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles. The processor 10 may be configured to implement the operation shown in FIG. 4.

If the instruction operation is a subroutine call (decision block 60, "yes" leg), the processor 10 may map the physical memory select values provided by the subroutine call (the "calling PMS") through the current memory select values in the memory select register 28 ("current MS") to determine a new set of physical memory select values to update in the memory select register 28 (block 62). That is, the processor 10 may treat the calling PMS values as virtual memory select values and map them through the current memory select values to obtain the new PMS. The processor 10 may update the memory select register 28 with the new PMS (in addition to saving the current memory select values in the link register 26, as described above). If the instruction operation is a return operation (decision block 60, "no" leg and decision block 64, "yes" leg), the processor 10 may update the memory select register 28 with the previously saved memory select values from the link register 26 (block 66). Otherwise, the update to the memory select register 28 is due to a load memory select operation (decision blocks 60 and 64, "no" legs) and the processor 10 may update the memory select register 28 with the supplied value (block 68).

Figure 5:
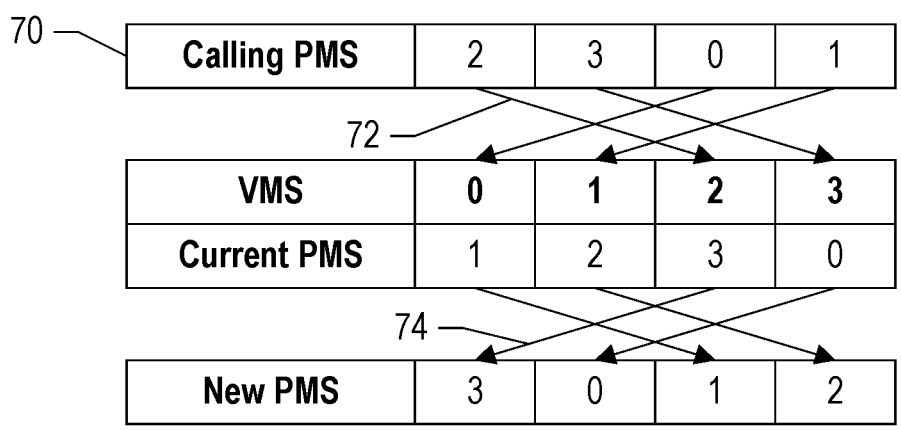
FIG. 5 is a block diagram of one embodiment of an example of update to the memory select register.

FIG. 5 is an example of the mapping of a calling PMS to the new PMS, as discussed above with regard to block 62. For this example, there are four data memories 18A-18N, numbered from PMS 0 (memory 18A) to PMS 3 (memory 18N). The calling PMS is arranged from left to right in FIG. 5 corresponding to VMS 0 through VMS 3. Thus, the calling PMS maps VMS 0 to PMS 2, VMS 1 to PMS 3, VMS 2 to PMS 0, and VMS 3 to PMS 1 (reference numeral 70). Treating the PMS values at reference numeral 70 as VMS values, the PMS 2 at VMS position 0 (arrow 72) is treated as VMS 2 in the current PMS and is mapped to PMS 3. Accordingly, the new value for VMS 0 is PMS 3 (arrow 74). Similarly, VMS 1 is mapped to PMS 3 in the calling PMS, which maps to PMS 0 in the current MS and thus the new value for VMS 1 is PMS 0; VMS 2 is mapped to PMS 0 in the calling PMS, which maps to PMS 1 in the current MS and thus the new value for VMS 2 is PMS 1; and VMS 3 is mapped to PMS 1 in the calling PMS, which maps to PMS 2 in the current MS and thus the new value for VMS 3 is PMS 2.

Figure 6:
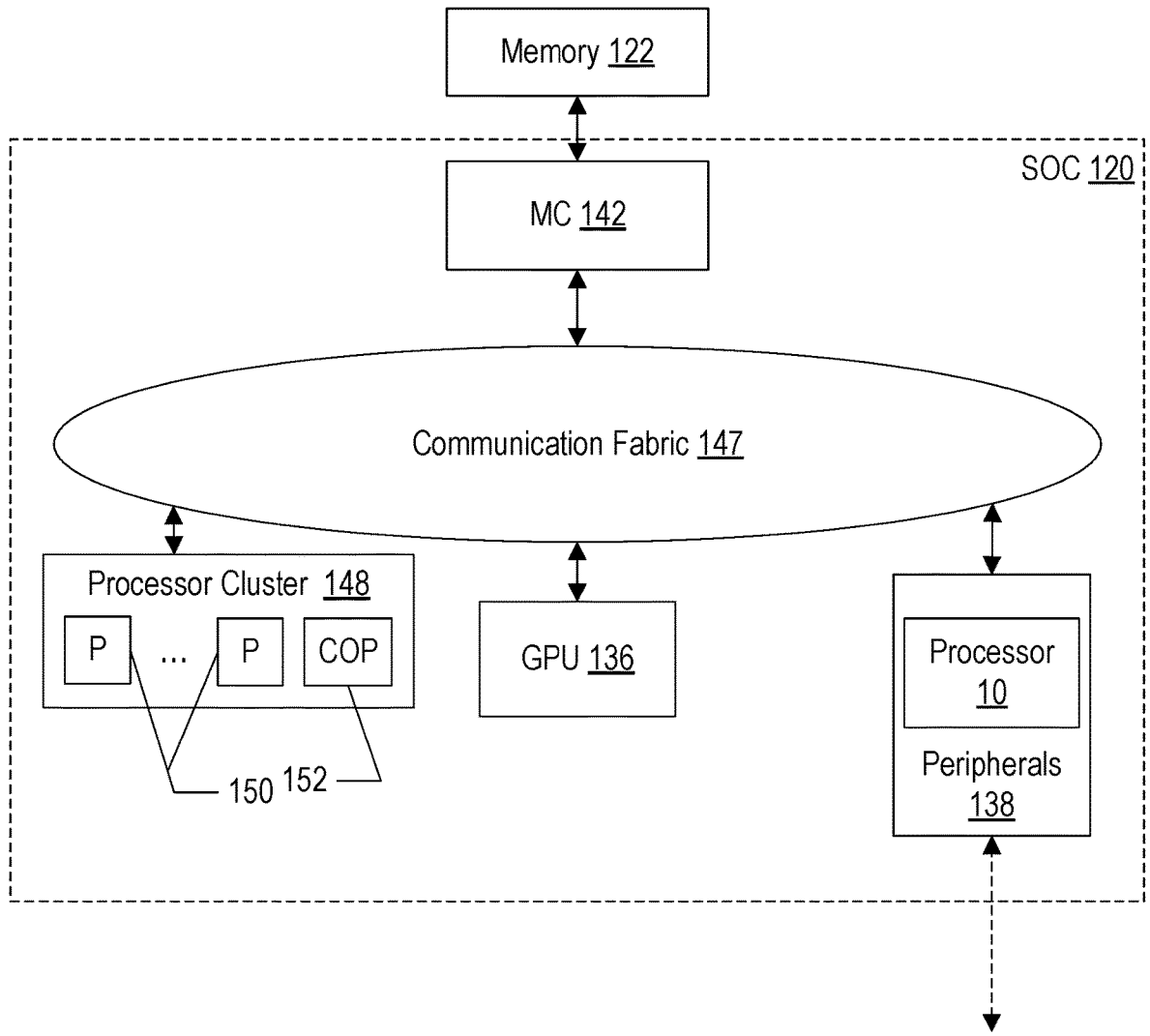
FIG. 6 is a block diagram of one embodiment of a system on a chip (SOC) implement the processor shown in FIG. 1.

FIG. 6 is a block diagram of one embodiment a system that includes a system on a chip (SOC) 120 coupled to a memory 122. As implied by the name, the components of the SOC 120 may be integrated onto a single semiconductor substrate as an integrated circuit "chip." In the illustrated embodiment, the components of the SOC 120 include at least one processor cluster 148, a graphics processing unit (GPU) 136, one or more peripheral components such as peripheral component 18 (more briefly, "peripherals"), a memory controller 142, and a communication fabric 147. The components 148, 136, 138, and 142 may all be coupled to the communication fabric 147. The memory controller 142 may be coupled to the memory 122 during use. In some embodiments, there may be more than one memory controller coupled to a corresponding memory. The memory address space may be mapped across the memory controllers in any desired fashion in such embodiments. In the illustrated embodiment, the processor cluster 148 may include a plurality of processors (P) 150. The processors 150 may form the central processing units (CPU(s)) of the SOC 120. The processor cluster 148 may further include one or more coprocessors (e.g., the coprocessor 152 in FIG. 6) that may be optimized for a subset of the processor instruction set and may be used by the processors 150 to execute instructions in the subset. For example, the coprocessor 152 may be a matrix engine optimized to perform vector and matrix operations.

As mentioned above, the processor cluster 148 may include one or more processors 150 that may serve as the CPU of the SOC 120. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 120) or other levels of integration. Processors may further encompass discrete microprocessors, processor cores and/or microprocessors integrated into multichip module implementations, processors implemented as multiple integrated circuits, etc.

The memory controller 142 may generally include the circuitry for receiving memory operations from the other components of the SOC 120 and for accessing the memory 122 to complete the memory operations. The memory controller 142 may be configured to access any type of memory 122. For example, the memory 122 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 142 may include queues for memory operations, for ordering (and potentially reordering) the operations and presenting the operations to the memory 122. The memory controller 142 may further include data buffers to store write data awaiting write to memory and read data awaiting return to the source of the memory operation. In some embodiments, the memory controller 142 may include a memory cache to store recently accessed memory data. In SOC implementations, for example, the memory cache may reduce power consumption in the SOC by avoiding reaccess of data from the memory 122 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 142.

The peripherals 138 may be any set of additional hardware functionality included in the SOC 120. For example, the peripherals 138 may include one or more instances of the processor 10 shown in FIG. 1. For example, the processor 10 may serve as an audio processor. The peripherals 138 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors such as the processor 1, digital signal processors, mixers, etc. The peripherals may include interface controllers for various interfaces external to the SOC 120 including interfaces such as Universal Serial Bus (USB), peripheral component interconnect (PCI) including PCI Express (PCIe), serial and parallel ports, etc. The interconnection to external device is illustrated by the dashed arrow in FIG. 6 that extends external to the SOC 120. The peripherals may include networking peripherals such as media access controllers (MACs). Any set of hardware may be included.

The communication fabric 147 may be any communication interconnect and protocol for communicating among the components of the SOC 120. The communication fabric 147 may be bus-based, including shared bus configurations, cross bar configurations, and hierarchical buses with bridges. The communication fabric 147 may also be packetbased, and may be hierarchical with bridges, cross bar, point-to-point, or other interconnects.

It is noted that the number of components of the SOC 120 (and the number of subcomponents for those shown in FIG. 6, such as the processors 150 in each processor cluster 148 or the processor 10 in the peripherals 138) may vary from embodiment to embodiment. Additionally, the number of processors 150 in one processor cluster 148 may differ from the number of processors 150 in another processor cluster 148 when multiple processor clusters are included. There may be more or fewer of each component/subcomponent than the number shown in FIG. 6.

In accordance with the above, a processor may comprise a plurality of data memories configured to store data operands for the processor and an execution circuit coupled to the data memories. The execution circuit may be configured to execute instructions defined by an instruction set architecture (ISA) implemented by the processor. At least one instruction defined in the ISA may specify at least one operand stored in one of the plurality of data memories via a virtual memory select value and an address. The execution circuit may include a memory select register that is configured to store a programmable mapping of respective virtual memory select values to respective physical memory select values. The execution circuit may be configured to map the virtual memory select value to the respective physical memory select value and to access one of the plurality of data memories that corresponds to the respective physical memory select value to access the at least one operand. In an embodiment, the execution circuit may be configured to execute a subroutine call operation that includes an updated mapping for the memory select register that specifies a plurality of memory select values. The execution circuit may be configured to map the plurality of memory select values through a current mapping in the memory select register to determine a modified mapping. The execution circuit may be configured to update the memory select register with the modified mapping. In an embodiment, the execution circuit comprises a second register (e.g., a link register); and the execution circuit may be configured to save the current mapping from the memory select register to the second register based on the subroutine call operation. In an embodiment, the execution circuit may be configured to execute a return operation that terminates a subroutine called by the subroutine call operation. The execution circuit may be configured to restore the memory select register from the second register based on the return operation. In an embodiment, the instruction includes a memory control field, and the execution circuit may be configured to map the virtual memory select value to the respective physical memory select value based on a first value coded into the memory control field. In an embodiment, the execution circuit may be configured to use the virtual memory select value as the respective physical memory select value based on a second value coded into the memory control field. In an embodiment, the execution circuit may be configured to map the virtual memory select value to a second respective physical memory select value based on the second register (e.g., the link register) and further based on a third value coded into the memory control field. In an embodiment, the execution circuit may be configured to execute a load memory select operation that specifies an updated value for the memory select register. The execution circuit may be configured to write the updated value to the memory select register.

Computer System

Figure 7:
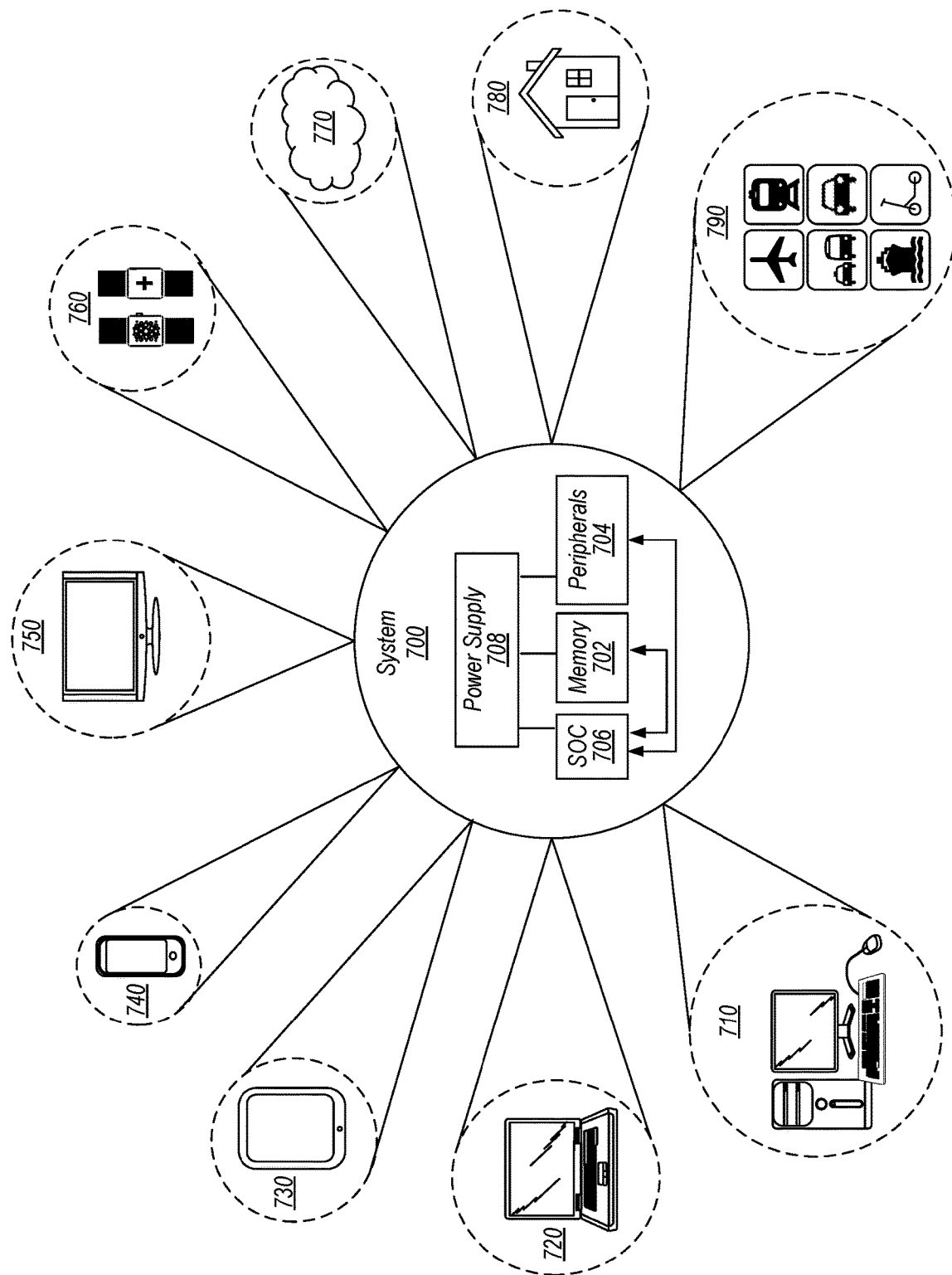
FIG. 7 is a block diagram of one embodiment of a system including the SOC shown in FIG. 6.

Turning next to FIG. 7, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The memory 702 may include the memory 122 illustrated in FIG. 5, in an embodiment. The SOC 706 may be an instance of the SOC 120 illustrated in FIG. 5, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

Computer Readable Storage Medium

Figure 8:
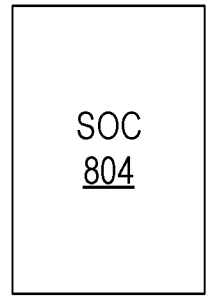
FIG. 8 is a block diagram of one embodiment of a computer accessible storage medium.

Turning now to FIG. 8, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 8 may store a database 804 representative of the SOC 120. Generally, the database 804 may be a database which can be read by a program and used, directly or indirectly, to fabricate the hardware comprising the SOC 120. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 120. The netlist may then be placed and routed to produce a data set describing geometric shapes to be applied to masks. The masks may then be used in various semiconductor fabrication steps to produce a semiconductor circuit or circuits corresponding to the SOC 120. Alternatively, the database 804 on the computer accessible storage medium 800 may be the netlist (with or without the synthesis library) or the data set, as desired.

While the computer accessible storage medium 800 stores a representation of the SOC 120, other embodiments may carry a representation of any portion of the SOC 120, as desired, including any subset of the components shown in FIG. 6. The processor 10 may be the portion represented in the database 804. The database 804 may represent any portion of the above.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor comprising:
   a plurality of data memories configured to store data operands for the processor, wherein a given one of the plurality of data memories includes a respective range of multiple addressable memory locations; and
   an execution circuit coupled to the plurality of data memories, wherein:
   the execution circuit is configured to execute instructions defined by an instruction set architecture (ISA) implemented by the processor;
   at least one of the instructions defined by the ISA specifies at least one operand stored in a particular one of the plurality of data memories by specifying a first virtual memory select value for selecting the particular one of the plurality of data memories and an address within the particular one of the plurality of data memories;
   the execution circuit includes a memory select register that is configured to store a programmable mapping of respective virtual memory select values to respective physical memory select values for the plurality of data memories; and the execution circuit is configured to map the first virtual memory select value to a first physical memory select value corresponding to the particular one of the plurality of data memories and to access the particular one of the plurality of data memories to access the at least one operand.

2. The processor as recited in claim 1 wherein:

the execution circuit is configured to execute a subroutine call operation that includes an updated mapping for the memory select register and specifies a plurality of updated memory select values;

the execution circuit is configured to map the plurality of updated memory select values through a current mapping in the memory select register to determine a modified mapping; and the execution circuit is configured to update the memory select register with the modified mapping.

3. The processor as recited in claim 2 wherein:

the execution circuit comprises a second register; and the execution circuit is configured to save the current mapping from the memory select register to the second register based on the subroutine call operation.

4. The processor as recited in claim 3 wherein:

the execution circuit is configured to execute a return operation that terminates a subroutine called by the subroutine call operation; and the execution circuit is configured to restore the memory select register from the second register based on the return operation.

5. The processor as recited in claim 1 wherein the at least one of the instructions includes a memory control field, and wherein the execution circuit is configured to use the memory select register to map the first virtual memory select value to the first physical memory select value based on a first value coded into the memory control field.

6. The processor as recited in claim 5 wherein the execution circuit is configured to use the first virtual memory select value as the first physical memory select value based on a second value coded into the memory control field.

7. The processor as recited in claim 5 wherein:

the execution circuit comprises a second register;

the execution circuit is configured to save a current mapping from the memory select register to the second register based on a subroutine call operation that provides an updated mapping for the memory select register; and the execution circuit is configured to map the first virtual memory select value to a second physical memory select value based on the second register and further based on a third value coded into the memory control field.

8. The processor as recited in claim 1 wherein:

the execution circuit is configured to execute a load memory select operation that specifies an updated value for the memory select register; and the execution circuit is configured to write the updated value to the memory select register.

9. The processor as recited in claim 1 wherein the plurality of data memories are configured to store respective independent streams of data samples that represent signals.

10. The processor as recited in claim 9 wherein the signals are audio signals.

11. The processor as recited in claim 1 wherein the execution circuit is configured to perform audio processing on audio data stored in one or more of the plurality of data memories.

12. A system comprising:

one or more memory devices; and a system-on-a-chip (SOC) coupled to the one or more memory devices, the SOC comprising:

one or more central processing unit (CPU) processors; and a peripheral circuit comprising a peripheral processor that comprises:

a plurality of data memories configured to store data operands for the peripheral processor, wherein a given one of the plurality of data memories includes a respective range of multiple addressable memory locations; and an execution circuit coupled to the plurality of data memories, wherein:

the execution circuit is configured to execute instructions defined by an instruction set architecture (ISA) implemented by the peripheral processor;

at least one of the instructions defined by the ISA specifies at least one operand stored in a particular one of the plurality of data memories by specifying a first virtual memory select value for selecting the particular one of the plurality of data memories and an address within the particular one of the plurality of data memories;

the execution circuit includes a memory select register that is configured to store a programmable mapping of respective virtual memory select values to respective physical memory select values for the plurality of data memories; and the execution circuit is configured to map the first virtual memory select value to a first physical memory select value corresponding to the particular one of the plurality of data memories and to access the particular one of the plurality of data memories to access the at least one operand.

13. The system as recited in claim 12 wherein the peripheral processor is an audio processor configured to process audio data that represents sound.

14. The system as recited in claim 12 wherein:

the execution circuit is configured to execute a subroutine call operation that includes an updated mapping for the memory select register and specifies a plurality of updated memory select values;

the execution circuit is configured to map the plurality of updated memory select values through a current mapping in the memory select register to determine a modified mapping; and the execution circuit is configured to update the memory select register with the modified mapping.

15. The system as recited in claim 14 wherein:

the execution circuit comprises a second register; and the execution circuit is configured to save the current mapping from the memory select register to the second register based on the subroutine call operation.

16. The system as recited in claim 15 wherein:

the execution circuit is configured to execute a return operation that terminates a subroutine called by the subroutine call operation; and the execution circuit is configured to restore the memory select register from the second register based on the return operation.

17. The system as recited in claim 12 wherein the at least one of the instructions includes a memory control field, and wherein the execution circuit is configured to use the memory select register to map the first virtual memory select value to the first physical memory select value based on a first value coded into the memory control field.

18. A method comprising:
- executing a load operation in a processor that includes a plurality of data memories configured to store data operands for the processor, wherein a given one of the plurality of data memories includes a respective range of multiple addressable memory locations, and wherein the load operation specifies a memory operand stored in a particular one of the plurality of data memories by specifying a virtual memory select value for selecting the particular one of the plurality of data memories and an address within the particular one of the plurality of data memories;
- mapping the virtual memory select value to a physical memory select value corresponding to the particular one of the plurality of data memories using a mapping stored in a memory select register, of respective virtual memory select values to respective physical memory select values for the plurality of data memories; and
- accessing the particular one of the plurality of data memories with the address to obtain the memory operand.

19. The method as recited in claim 18 further comprising:
- executing a subroutine call operation that includes an updated mapping for the memory select register and specifies a plurality of updated memory select values;
- mapping the plurality of updated memory select values through a current mapping in the memory select register to determine a modified mapping; and
- updating the memory select register with the modified mapping.

20. The method as recited in claim 19 further comprising:
- saving the current mapping from the memory select register to a second register based on the subroutine call operation.

\* \* \* \* \*